US012409425B2

(12) United States Patent
Alvisi et al.

(10) Patent No.: US 12,409,425 B2
(45) Date of Patent: Sep. 9, 2025

(54) MACHINE AND METHOD TO AUTOMATICALLY PREPARE FLUID COLORING PRODUCTS

(71) Applicant: COROB S.P.A., San Felice sul Panaro (IT)

(72) Inventors: Andrea Alvisi, Spilamberto (IT); Fabrizio Benatti, Cavezzo (IT)

(73) Assignee: COROB S.P.A., San Felie sul Panaro (IT)

(*) Notice: Subject to any disclaimer, the term of this patent is extended or adjusted under 35 U.S.C. 154(b) by 758 days.

(21) Appl. No.: 17/631,042

(22) PCT Filed: Aug. 10, 2020

(86) PCT No.: PCT/IT2020/050202

§ 371 (c)(1),
(2) Date: Jan. 28, 2022

(87) PCT Pub. No.: WO2021/028957

PCT Pub. Date: Feb. 18, 2021

(65) Prior Publication Data

US 2022/0314176 A1 Oct. 6, 2022

(30) Foreign Application Priority Data

Aug. 12, 2019 (IT) ........................ 102019000014610
Aug. 12, 2019 (IT) ........................ 102019000014613

(51) Int. Cl.
*B01F 29/30* (2022.01)
*B01F 29/62* (2022.01)
(Continued)

(52) U.S. Cl.
CPC .............. *B01F 29/30* (2022.01); *B01F 29/62* (2022.01); *B01F 31/201* (2022.01); *B01F 33/84* (2022.01);
(Continued)

(58) Field of Classification Search
CPC ........ B01F 29/30; B01F 29/62; B01F 31/201; B01F 33/84; B01F 35/423; B01F 35/7131; B01F 2101/30; B01F 31/20
(Continued)

(56) References Cited

U.S. PATENT DOCUMENTS 4,134,689 A * 1/1979 Ahrenskou-Sorensen ................. B01F 31/265 366/605
4,588,302 A * 5/1986 Pizzi ........................ B44D 3/06 100/219
(Continued)

FOREIGN PATENT DOCUMENTS

EP 0 779 241 6/1997
EP 1 417 024 5/2004
(Continued)

OTHER PUBLICATIONS

International Search Report and Written Opinion corresponding to International Patent Application No. PCT/IT2020/050202, mailed Dec. 3, 2020.

*Primary Examiner* — Charles Cooley
(74) *Attorney, Agent, or Firm* — Kinney & Lange, P.A.

(57) ABSTRACT

A machine (10) to automatically prepare a fluid coloring product inside a container (15), which can already contain a base product, comprises a loading station (26), a perforating device to make an aperture in the upper part of the container (15), a delivery device (21) configured to deliver coloring substances inside the container through such aperture, and a closing device configured to automatically closed such aperture with a closing element, after the delivery of the coloring substances.

17 Claims, 9 Drawing Sheets

(51) Int. Cl.
*B01F 31/20* (2022.01)
*B01F 33/84* (2022.01)
*B01F 35/42* (2022.01)
*B01F 35/71* (2022.01)
*B01F 101/30* (2022.01)

(52) U.S. Cl.
CPC ........ *B01F 35/423* (2022.01); *B01F 35/7131* (2022.01); *B01F 2101/30* (2022.01)

(58) Field of Classification Search
USPC ........ 366/110, 111, 114, 208–211, 219, 605, 366/217
See application file for complete search history.

(56) References Cited

U.S. PATENT DOCUMENTS 4,842,415 A * 6/1989 Cane ..................... B01F 35/422 366/605
5,066,136 A * 11/1991 Johnson .................. B01F 31/20 366/605
5,197,802 A * 3/1993 Miller ..................... B01F 29/32 366/217
5,261,744 A * 11/1993 Brunn ..................... B01F 29/10 366/217
5,268,620 A * 12/1993 Hellenberg ............. B01F 35/20 366/605
5,310,257 A * 5/1994 Altieri, Jr. ............. B01F 35/423 100/219
5,383,163 A * 1/1995 Brunn ................... B01F 35/423 366/217
5,507,575 A * 4/1996 Rossetti .................. B01F 31/20 366/217
5,711,601 A * 1/1998 Thomas ................ B01F 35/423 366/217
5,749,652 A * 5/1998 Brunn ...................... B44D 3/08 366/605
5,788,371 A * 8/1998 Neri ...................... B01F 35/423 366/217
5,897,204 A * 4/1999 Dittmer ................. B01F 31/201 366/209
5,906,433 A * 5/1999 Mazzalveri ............. B01F 31/20 366/605
6,850,020 B1 * 2/2005 Midas ................... B01F 35/423 318/470
6,883,955 B2 * 4/2005 Salas ..................... B01F 31/201 366/601
7,165,879 B2 * 1/2007 Midas ................... B01F 35/423 366/217
7,311,437 B2 * 12/2007 Midas ................... B01F 35/423 366/217
7,344,300 B2 * 3/2008 Midas ..................... B01F 29/30 366/217
8,157,436 B2 * 4/2012 Curtis ..................... B01F 29/32 366/208
12,280,347 B2 * 4/2025 Rossetti .............. B01F 35/2207
2004/0013031 A1 * 1/2004 Salas ..................... B01F 31/201 366/601
2004/0202045 A1 * 10/2004 Marazzi ................ B01F 31/201 366/209
2005/0088911 A1 * 4/2005 Sordelli ................ B01F 35/423 366/217
2005/0169102 A1 * 8/2005 Manke .................. B01F 29/322 366/209
2005/0213426 A1 * 9/2005 Midas ................... B01F 35/423 366/209
2005/0286341 A1 * 12/2005 Midas ................... B01F 35/423 366/217
2006/0077754 A1 * 4/2006 Bressani ................. B01F 29/10 366/217
2007/0081416 A1 * 4/2007 Midas ..................... B01F 29/30 366/217
2007/0081417 A1 * 4/2007 Midas ..................... B01F 29/30 366/217
2007/0081418 A1 * 4/2007 Midas ..................... B01F 29/30 366/217
2008/0269950 A1 * 10/2008 Greco ..................... B01F 31/24 700/265
2009/0190437 A1 * 7/2009 Greco ................. B01F 35/2209 366/209
2010/0074047 A1 * 3/2010 Benatti ................... B01F 29/10 366/213
2021/0370251 A1 * 12/2021 Alvisi ....................... F04B 9/04
2022/0314176 A1 * 10/2022 Alvisi ..................... B01F 29/62

FOREIGN PATENT DOCUMENTS

EP 2 272 584 1/2011
EP 2 384 808 11/2011
FR 2 867 768 9/2005
WO 2007/110764 10/2007
WO WO-2008095968 A1 * 8/2008 ........ B01F 15/00753
WO 2011/161532 12/2011

* cited by examiner

MACHINE AND METHOD TO AUTOMATICALLY PREPARE FLUID COLORING PRODUCTS

FIELD OF THE INVENTION

The present invention concerns a machine and corresponding method to automatically prepare fluid coloring products, for example coloring liquids, paints, enamels, inks, or other fluid coloring substances, contained in a container in which, possibly, a base product can already be present. The present invention allows the user to introduce into the machine a container, possibly containing the base product, and to select the color he/she wants to obtain, after which the machine is able to automatically make both an aperture in the upper part of the container, and to deliver the coloring pigments in the container, and also to close said aperture with a suitable closing element, for example a lid, and also to mix the coloring pigments with the base product, in order to obtain the selected coloring product and make it available to the end user, ready for use.

BACKGROUND OF THE INVENTION

Machines for dispensing or delivering coloring products are known, able to introduce a metered quantity of coloring substances, for example coloring pigments, into a container, in which, possibly, a base product is already contained, in order to obtain the desired coloring product.

Mixing machines are also known, often distinct from dispensing machines, able to mix the coloring product obtained using dispensing machines, so as to mix and homogenize the pigments that color the base product and thus obtain a finished product, ready for use.

From the international patent application WO-A-2011/161532 and from the European patent application EP-A1-2.384.808 machines are also known in which there are both means to deliver the coloring product inside a container and also means to mix the product dispensed into the container. In both these known machines, each container is already provided, in its upper part, with a hole which is permanently closed by a membrane of elastic/elastomeric material, configured to be perforated by the injection nozzles which are part of the delivery means.

However, these known machines have the disadvantage that they can only be used with particular, non-standard containers, each provided with the membrane as above.

Other types of machines known in the state of the art are suitable, in particular, to be used to automatically fill metal containers, such as for example cylindrical cans. Some known machines of this type are described, for example, in the prior art documents EP-A1-0.779.241, FR-A1-2.867.768, WO-A2-2007/110764, EP-A1-2.272.584. These machines comprise a dispensing unit for the fluid coloring product which is also able to make an opening hole on the upper surface of the containers, and to plug this opening hole once the dispensing has been completed.

One purpose of the present invention is to provide a machine and to perfect the corresponding method to automatically prepare fluid coloring products, inside a container in which, possibly, a base product may already be present, which are simple, fast and reliable, and which are also able to make, before the delivery, an aperture in the upper part of the container, and also to automatically and hermetically close said aperture after delivery and before mixing the products contained in the container.

Another purpose of the present invention is to provide a machine and to perfect the corresponding method to automatically prepare fluid coloring products, which are also able to perform, after the delivery of the coloring substances into the container, a mixing of the products contained in the container, possibly using members of the machine that are intended for other functions, or using members that are intended for mixing but to perform other functions of the machine, for example, but not only, the delivery as above.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The corresponding dependent claims describe other characteristics of the invention or variants to the main inventive idea.

In accordance with the above purpose, a machine according to the present invention, to automatically prepare a fluid coloring product contained inside a container, comprises delivery means configured to deliver at least one or more coloring substances, possibly together with other non-coloring substances, inside the container through an aperture provided in the upper part of the latter, when it is in a delivery position.

In accordance with one characteristic of the present invention, the machine also comprises perforating means configured to make the aperture, and closing means configured to automatically and hermetically close the aperture with at least one closing element, preferably of the removable type.

In accordance with one characteristic of the present invention, the machine also comprises mixing means configured to shake the container and therefore mix the coloring substances, possibly with the base product, inside the container when the latter is in a mixing position.

In accordance with one characteristic of the present invention, the machine also comprises a support member configured to support the container, both in the delivery position and also in the mixing position. According to some embodiments provided here, the support member comprises a lower plate provided with its own central axis, preferably vertical, which is substantially parallel to, or coinciding with, a first vertical axis, or axis of delivery, around which the delivery means are disposed when the container is in the delivery position, and which on the other hand is substantially parallel to, or coinciding with, an axis of rotation, or first mixing axis, when the container is in the mixing position.

In accordance with one characteristic of the present invention, the delivery means comprise a delivery device disposed vertically in a fixed position above a loading station of the containers, in substantial alignment with the first vertical axis as above.

In accordance with one characteristic of the present invention, the perforating means and the closing means are mounted on a slider slidable along a transverse axis that intersects the first vertical axis as above.

In accordance with one characteristic of the present invention, the perforating means comprise a perforating device having a second vertical axis; the closing means comprise a closing device having a third vertical axis; and the slider is selectively mobile between an inactive position, in which both the second vertical axis and also the third vertical axis are distant from the first vertical axis, and at least a first operative position, in which the second vertical axis is substantially coinciding with the first vertical axis.

In accordance with another characteristic of the present invention, the slider is also selectively mobile between the inactive position as above and a second operative position, in which the third vertical axis is substantially coinciding with the first vertical axis.

In accordance with another characteristic of the present invention, the least one closing element as above comprises a lid, the closing device comprises a mandrel configured to insert the lid in the aperture of the container, and the machine comprises an operating unit comprising removal means configured to remove the lid from a store in which a plurality of lids is stored, and position it on the mandrel.

In accordance with another characteristic of the present invention, the removal means as above comprise a support on which a removal gripper is mounted having two jaws configured to remove one lid at a time from the store;

furthermore, the support is mobile at least between a removal position, in which the removal gripper is in correspondence with the store, and a delivery position, in which the removal gripper is in correspondence with the mandrel, when the slider is in the first operative position.

In accordance with another characteristic of the present invention, the lower plate as above is associated with transfer means configured to move it selectively in a bi-directional manner, possibly together with the container, between the delivery position and the mixing position as above, along a first longitudinal axis that intersects perpendicularly both the first vertical axis and also the axis of rotation.

In accordance with another characteristic of the present invention, the mixing means as above further comprise an upper contrast member, parallel to the lower plate; furthermore, the lower plate and the upper contrast member are configured to compress the container between them, when the container is in the mixing position.

In accordance with another characteristic of the present invention, the machine also comprises mixing means comprising at least a fixed structure configured to support the lower plate, and also comprising a rotating support on which an upper slider, which rotatably supports the upper contrast member, and a lower slider, which slidably supports the lower plate, are mounted sliding with reciprocal motion toward or away from each other in the same direction parallel to the axis of rotation.

In accordance with another characteristic of the present invention, second command means are provided to command the reciprocal movement of the two upper and lower sliders toward/away from each other, parallel to the first axis of rotation so as to determine the reciprocal movement toward/away from each other of the upper contrast member and the lower plate, parallel to the axis of rotation.

In accordance with another characteristic of the present invention, the machine also comprises programmable command means, for example comprising an electronic processor, configured to drive the perforating means, in order to make the aperture in the upper part of the container, the delivery means in order to deliver the at least one or more coloring substances into the container through the aperture, and the closing means, while the container is in the delivery position, in a manner coordinated with the displacement of the slider along the transverse axis. The programmable command means as above are also configured to drive the mixing means and to control the movement of the lower plate.

In particular, the programmable command means, for example comprising an electronic processor, are also configured to drive first the transfer means, in order to take the container from the delivery position toward a mixing position, then the mixing means, in order to adequately mix the fluid products contained inside the container, and finally once again the transfer means, in order to return the container from the mixing position to the delivery position in the loading station.

In accordance with another characteristic of the present invention, a method to automatically prepare a fluid coloring product inside a container, which possibly already contains a base product, by means of a machine comprising delivery means configured to deliver at least one or more coloring substances, possibly together with other non-coloring substances, inside the container through an aperture made in the upper part of the latter, comprises, when the container is in a delivery position, at least a perforation step in which perforating means are activated in order to make the aperture, a subsequent delivery step in which the delivery means deliver the at least one or more coloring substances inside the container through the aperture, and a subsequent closing step in which closing means are activated in order to automatically and hermetically close the aperture of the container with at least one closing element, preferably of the removable type.

In accordance with one characteristic of the present invention, the method further comprises a mixing step, in which mixing means mix the at least one or more coloring substances, possibly together with the base product and/or other non-coloring substances, in which it is provided that the container is supported by a support member both during the delivery step, when the container is in the delivery position, and also during the mixing step, when the container is in the mixing position.

In accordance with another characteristic of the present invention, the perforation step, the delivery step and the closing step as above are performed in succession while the container is in the delivery position, in correspondence with a loading station of the containers.

In accordance with one variant embodiment, the method according to the present invention also comprises a transfer step, in which transfer means, after the closing step as above, transfer the support member, together with the container, from the delivery position to the mixing position and, after the mixing step, transfer the support member, together with the container, from the mixing position to the delivery position.

In accordance with another characteristic of the present invention, simultaneously with the delivery step, or the mixing step, there is provided a step of removing the closing element from a store, in which it is provided to drive means to remove the closing element alternatively between an inactive position, in which the removal means are configured to release the closing elements, one at a time, to a mandrel comprised in the closing means, and a removal position in which the removal means are operationally aligned with the store in order to remove from the latter the closing element disposed at the lowest point.

BRIEF DESCRIPTION OF THE DRAWINGS

These and other characteristics of the present invention will become apparent from the following description of a preferred embodiment, given as a non-restrictive example with reference to the attached drawings wherein.

We must clarify that in the present description and in the claims the terms high, low, vertical, horizontal, lower, upper, right, left, high and low, with their declinations, have the sole function of better illustrating the present invention with reference to the drawings and must not be in any way used to limit the scope of the invention itself, or the field of protection defined by the claims. For example, by the term horizontal we mean a plane that can be either parallel to the line of the horizon, or inclined, even by several degrees, for example up to 30°, with respect to the latter.

DESCRIPTION OF AN EMBODIMENT OF THE PRESENT INVENTION

Figure 1:
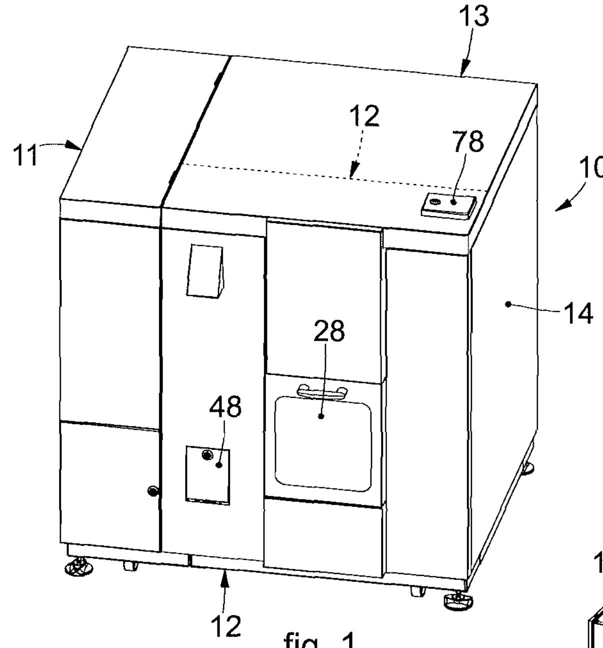
FIG. 1 is a first right front perspective view which schematically shows a machine according to the present invention, including its external cover.
Figure 2:
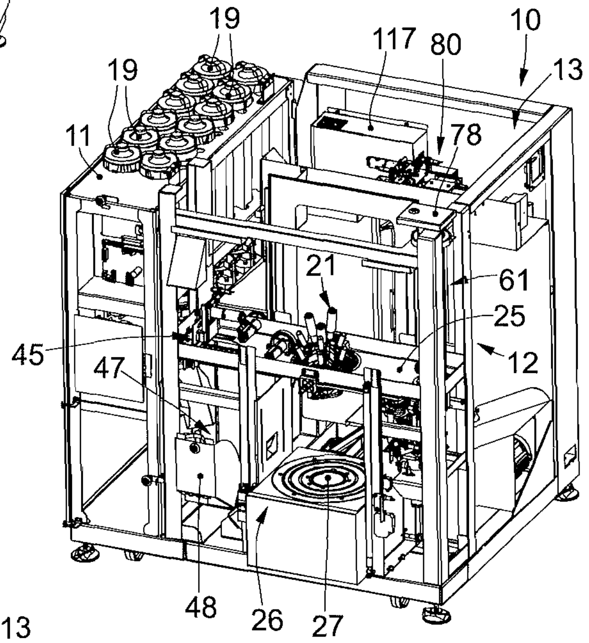
FIG. 2 is a second right front perspective view of the machine of FIG. 1, but without its external cover and without any container inserted in it.
Figure 3:
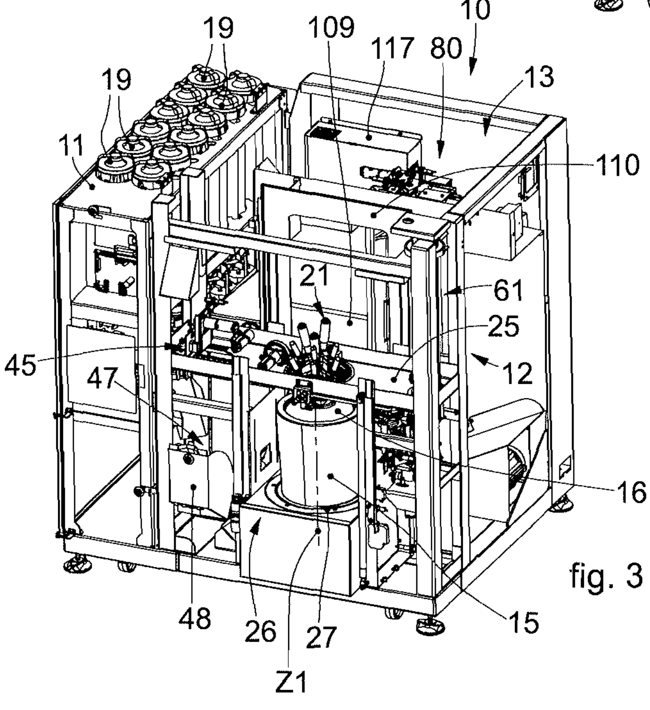
FIG. 3 is a third right front perspective view of the machine of FIG. 2, but with a container shown in a loading position.

With reference to FIGS. 1, 2 and 3, a machine 10 to automatically prepare fluid coloring products according to the present invention substantially comprises three compartments 11, 12 and 13, respectively first, second and third, which can also be made in an independent, but modular manner and which are mounted integrated with each other and closed by an external cover 14 (FIG. 1). For example, the fluid coloring products can be coloring liquids, paints, enamels, inks, or other fluid coloring substances, suitable to be contained in a container 15 (FIGS. 3 and 5) in which, possibly, a base product can already be present. For example, the base product can be a neutral, transparent, or white paint, to which one or more colorants are then added, substantially formed by coloring pigments.

The containers 15 can be either made of metal, for example of thin steel, or tin, or of plastic material, and preferably have a cylindrical shape, although they can have any other shape whatsoever, such as for example parallelepiped, with a square or rectangular base.

Figure 14:
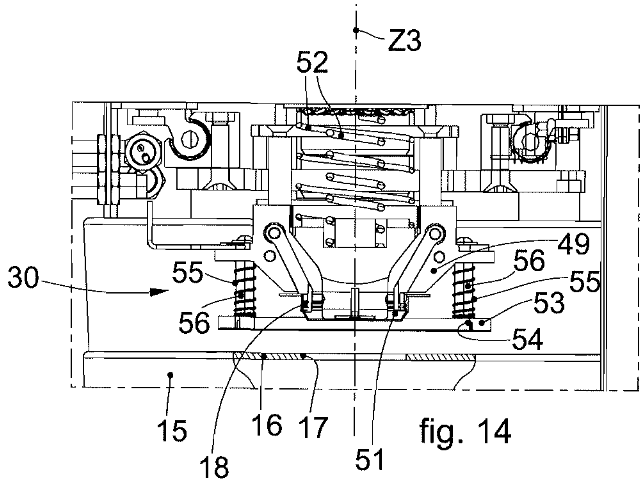
FIG. 14 is a partial front view, on a further enlarged scale, of a second detail of the sub-unit of FIG. 12.

Furthermore, each container 15 has an upper part 16 (FIGS. 3 and 14), made of a material that can be easily perforated, in which an aperture can be made by the machine 10 itself having, for example, the shape of a cylindrical hole 17 (FIG. 14), as will be described in detail below.

The cylindrical hole 17 is configured to be automatically and hermetically closed, in the same machine 10, as will be described in detail below, by means of a covering element, which in the example provided here is a lid 18, for example made of plastic material, preferably of the removable type. According to one variant, not shown in the drawings, the covering element could consist of an adhesive label.

In this embodiment, regardless of the shape and size of the container 15, the cylindrical hole 17 has a determinate diameter D1, which corresponds to the external diameter of the lower part of the lid 18 (FIG. 16), so that any lid 18 whatsoever, removed from a stack of lids 18, all identical to each other, can hermetically close each cylindrical hole 17 made on a container 15 being worked. The lid 18 also has both a determinate internal diameter D2 (FIGS. 11 and 16), slightly smaller than the external diameter D1 of its lower part, and also an external diameter D3 of its upper part.

Figure 7:
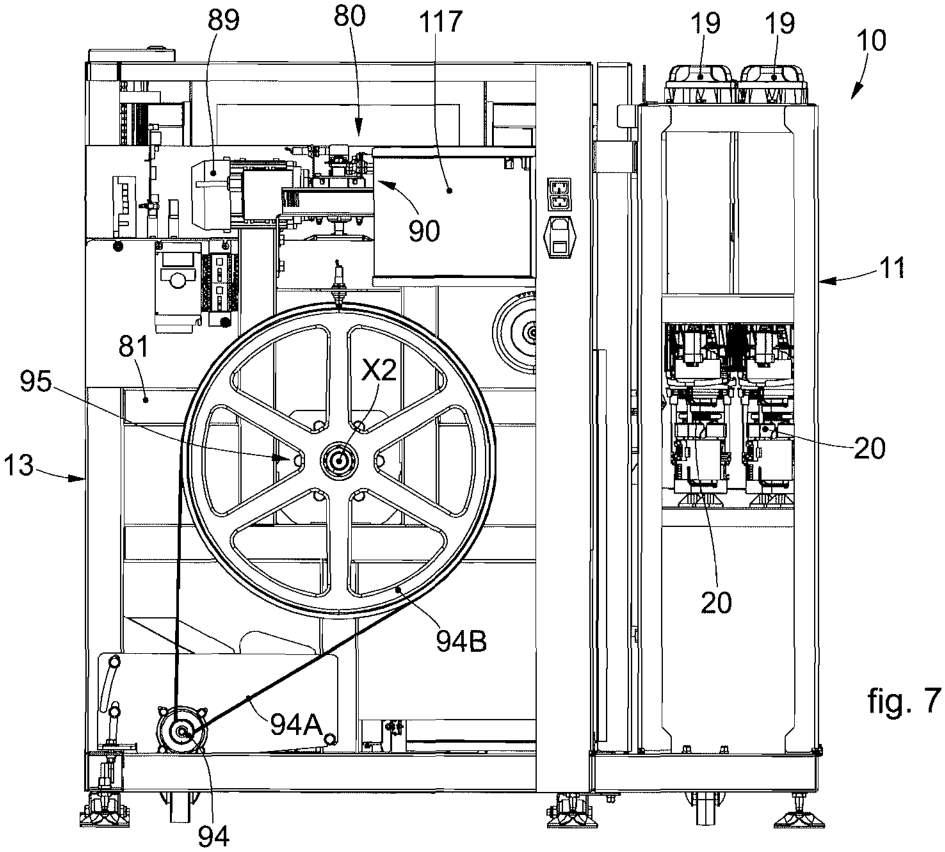
FIG. 7 is a rear view of the machine of FIG. 2.

In the first compartment 12, which is the furthest to the left in FIGS. from 1 to 5, and the furthest to the right in FIG. 7, there is disposed a plurality of tanks 19, which can be of any known type whatsoever, for example of the type described in European patent EP-B-1.744.826, or which will be developed in the future. Each tank 19 contains a different coloring substance, for example in the form of coloring pigments having a determinate color. In the example provided here, there are twelve tanks 19, therefore up to twelve different coloring substances can be contained in them, but it must be clear that the number of tanks 19 can also be lower than or greater than twelve.

A plurality of volumetric pumps 20 (FIG. 5), of any known type whatsoever, for example of the bellows type, are each connected to a corresponding tank 19 in order to selectively convey the coloring substance contained in the latter toward a single delivery device 21 (FIGS. from 2 to 5 and from 8 to 11) belonging to a first operating unit 22 disposed in the second compartment 12.

Figure 4:
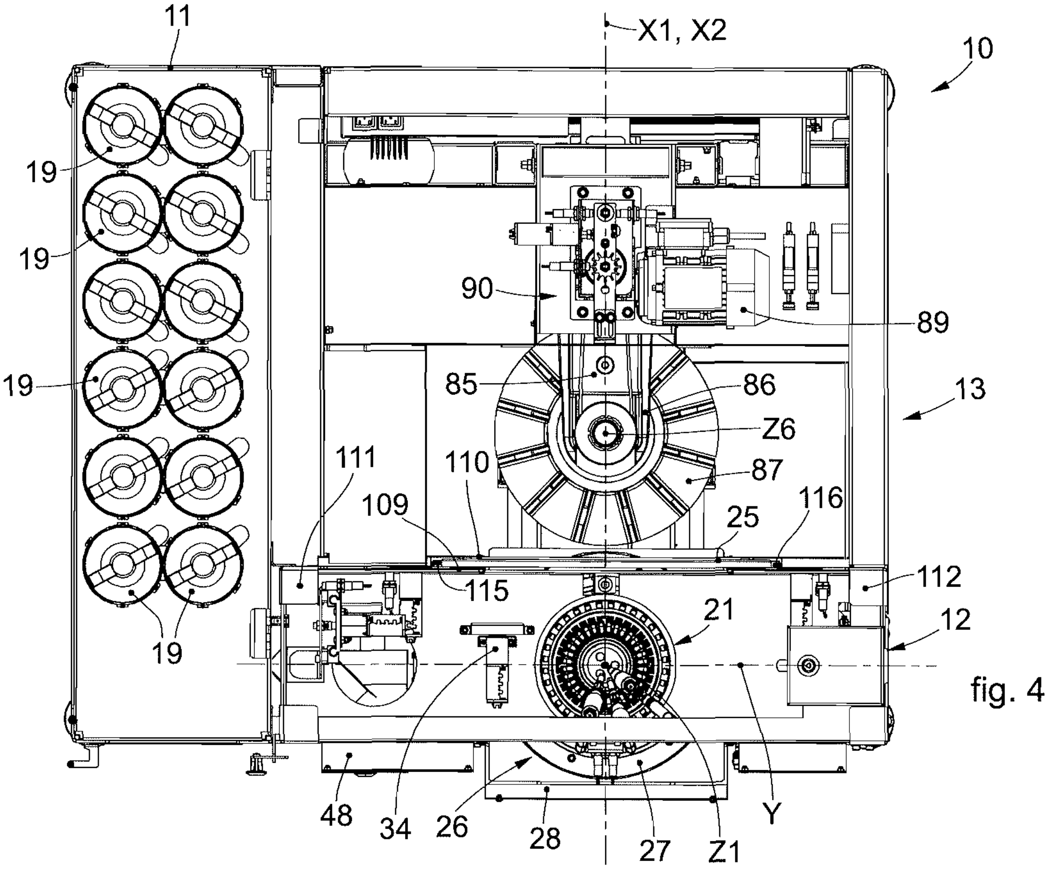
FIG. 4 is a top view of the machine of FIG. 2.

The delivery device 21 can be of any known type whatsoever, for example of the type described in Italian patent IT-B-1.370.076, or which will be developed in the future, and is positioned so that its center lies on a first vertical axis Z1 (FIGS. 4 and 5) which perpendicularly intersects a first longitudinal axis X1 (FIG. 4).

In the example provided here, the delivery device 21 comprises a plurality of nozzles 23 (FIG. 11), also of a known type, the number of which is the same as that of the tanks 19 and of the volumetric pumps 20. Each nozzle 23 is pointed and disposed in a substantially vertical position with the tip facing downward and is connected to a tubular terminal 24, which in turn is connected to a corresponding volumetric pump 20 by means of a tubular duct of any known type whatsoever and not shown in the drawings.

The delivery device 21 is mounted on a fixed plate 25 (FIGS. 2, 4 and 5) disposed horizontally above a station 26 for loading the containers 15.

The machine 10 comprises a lower plate 27, for example with a circular shape which develops axial symmetrical around a central axis of its own, which acts as a support element and optionally as a centering member for the container 15 temporarily inserted in the machine 10 in correspondence with the loading station 26.

Figure 5:
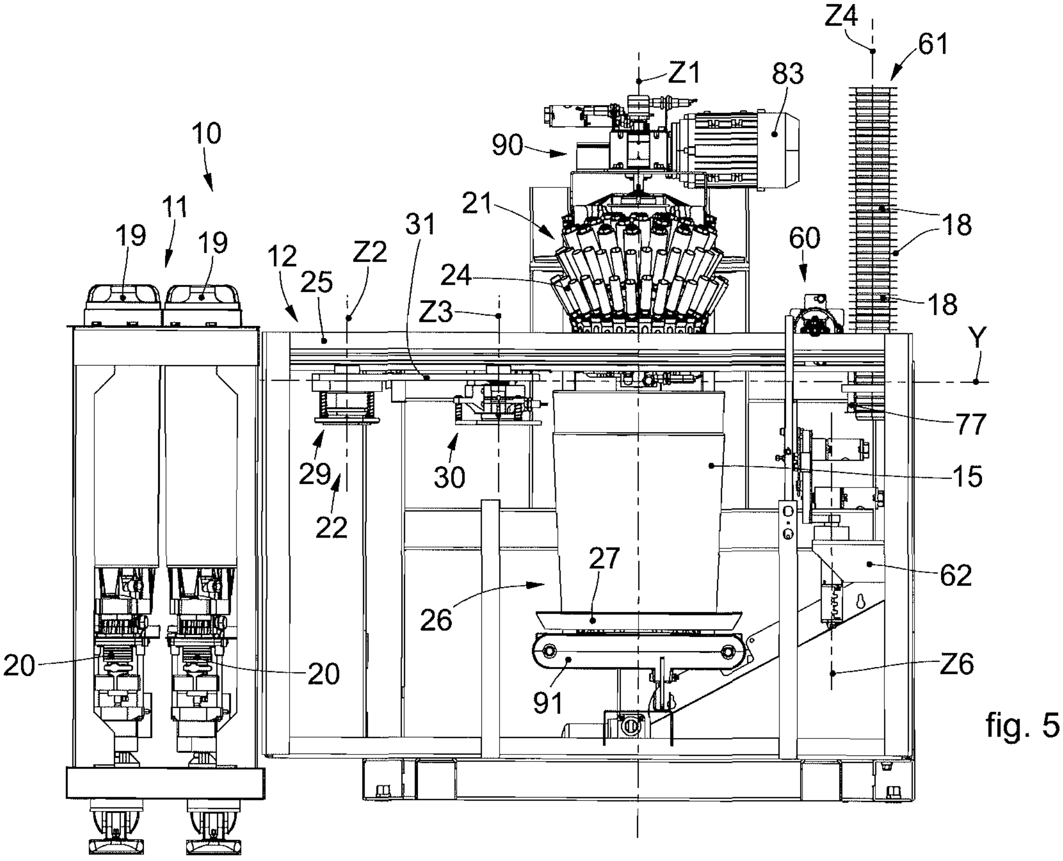
FIG. 5 is a front view of the machine of FIG. 3, that is, shown with a container in the loading position.
Figure 15:
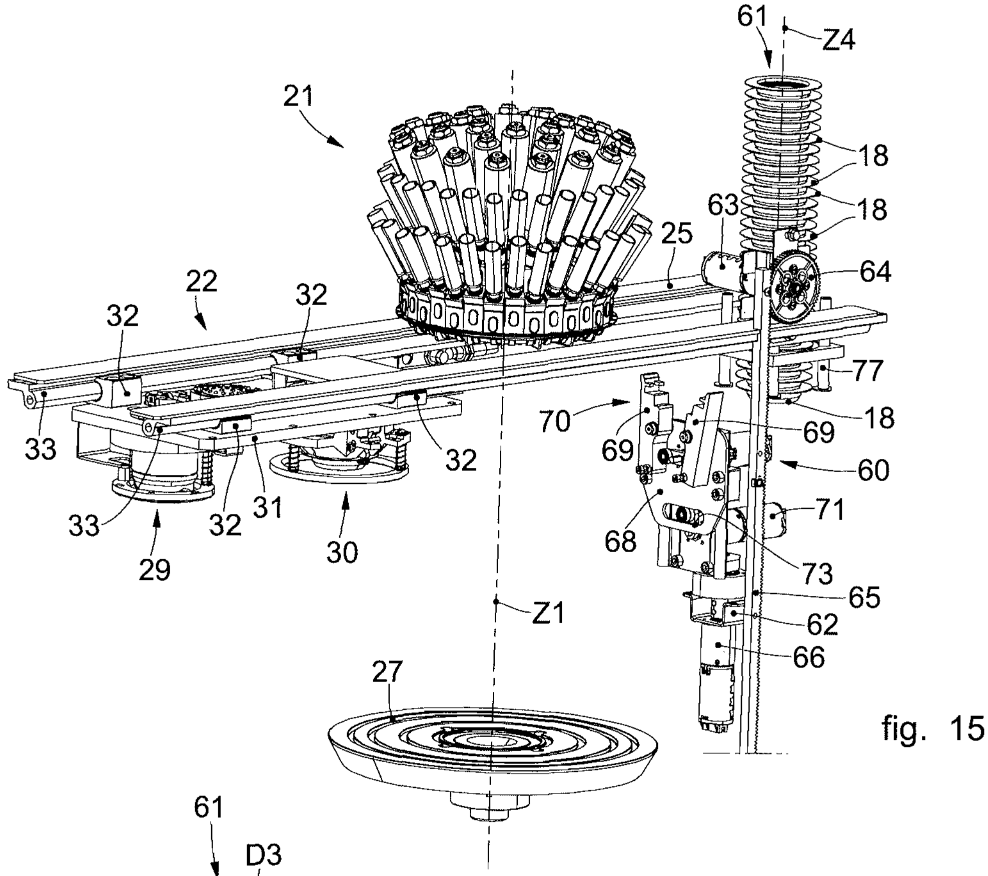
FIG. 15 is a left front perspective view of the first operating unit of FIG. 8, of a loading plate and of a second operating unit of the machine of FIG. 1.

In an inactive or loading position, the central axis of the lower plate 27 lies on the first vertical axis Z1 (FIGS. 5 and 15). As will be described in detail below, this position coincides with the position of delivery of the coloring substances inside the containers 15.

In the front part of the loading station 26 there is disposed a first small door 28 (FIG. 1), which is normally in a closed position, but which can be opened to allow to introduce or remove a container 15, and then closed again, for example manually.

The first operating unit 22 (FIGS. 5 and from 8 to 15), in addition to the delivery device 21, also comprises a perforating device 29, having the function of selectively making the cylindrical hole 17 in the upper part 16 of the container 15, and a closing device 30, having the function of selectively closing the cylindrical hole 17 with a lid 18, as will be described in detail below.

Figure 9:
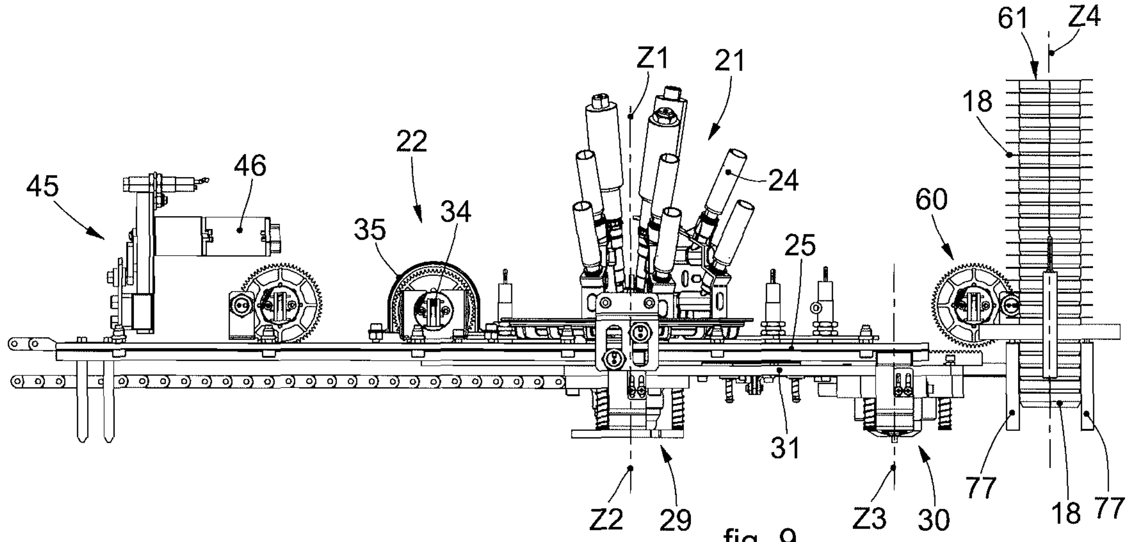
FIG. 9 is a front view of the first operating unit of FIG. 8, but shown in a first operative position.
Figure 10:
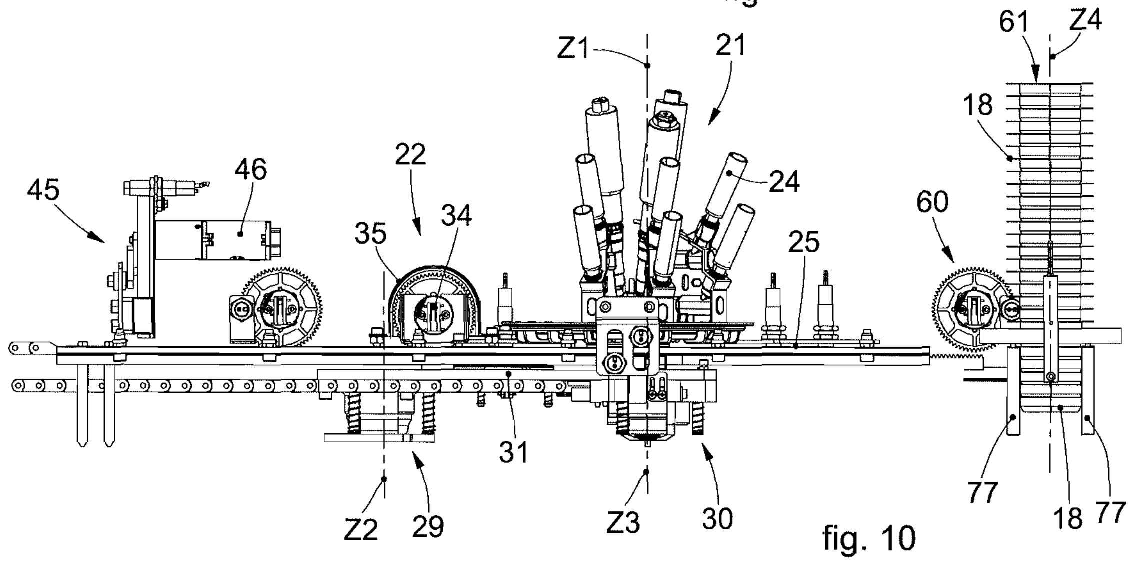
FIG. 10 is a front view of the first operating unit of FIG. 8, but shown in a second operative position.

The perforating device 29 and the closing device 30 are both mounted on a first slider 31 (FIG. 5), disposed below the fixed plate 25 and slidable parallel thereto along a transverse axis Y, perpendicular to both the first longitudinal axis X1 (FIG. 4) and also to the first vertical axis Z1 (FIG. 5), between one of the following three positions: an inactive position, shown in FIGS. 5 and 8, in which the same first slider 31 is completely displaced to the left of the delivery device 21; a first operative position, shown in FIG. 9, in which the same first slider 31 is completely displaced to the right, with the perforating device 29 exactly below the delivery device 21, that is, coaxial to the first vertical axis Z1; a second operative position, shown in FIG. 10, in which the same first slider 31 is in an intermediate zone, with the closing device 30 exactly below the delivery device 21, that is, coaxial to the first vertical axis Z1.

In particular, the first slider 31 is provided with two pairs of sliding blocks 32 (FIG. 15), slidable on two guide bars 33, parallel to each other and supported by the fixed plate 25, and is commanded by a first electric motor 34 (FIGS. from 8 to 11), mounted on the upper part of the fixed plate 25 and having its own shaft connected to a toothed wheel 35, constantly meshed with a horizontal rack 36 (FIG. 11) integral with the first slider 31.

Figure 12:
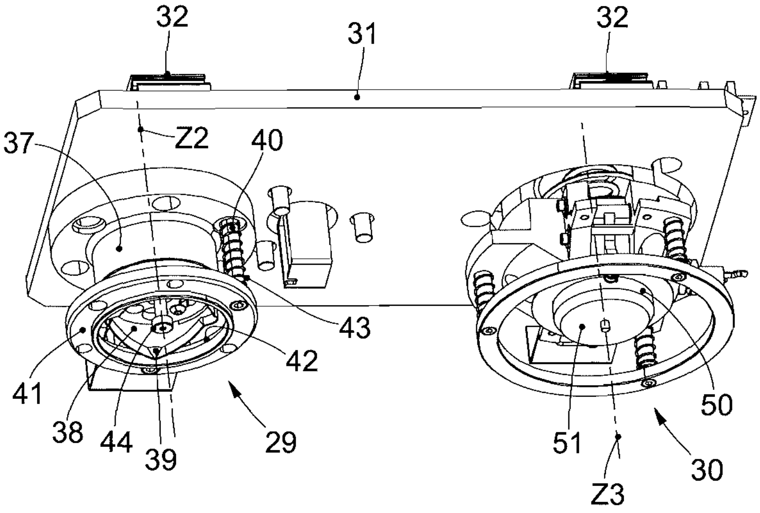
FIG. 12 is a perspective view, taken from below and from the left, of a sub-unit, on an enlarged scale, of the first operating unit of FIG. 8.

The perforating device 29 (FIGS. 12 and 13) comprises a cylindrical tubular support 37 preferably attached to the lower surface of the first slider 31 and having a second vertical axis Z2 which intersects the transverse axis Y (FIG. 5). Inside the cylindrical tubular support 37 there is attached a blade 38 (FIGS. 12 and 13) preferably with an annular shape, coaxial to the second vertical axis Z2 and shaped so as to define three cutting elements 39, for example pointed and with the tips facing downward, and preferably disposed angularly offset by 120° with respect to each other. The three cutting elements 39 have a shape such as to hold between them the cut cylindrical part of the upper part 16 of the container 15 when making the cylindrical hole 17, so that the part itself does not fall into the container 15.

The cylindrical tubular support 37, by means of three vertical rods 40 (only two visible in FIG. 13) which are disposed angularly offset by 120° with respect to each other, supports a first contrast ring 41 (FIG. 12), also coaxial to the second vertical axis Z2 and provided with a central hole 42 having a larger diameter than the external diameter of the blade 38. Three helical springs 43, supported by the cylindrical tubular support 37 and disposed around the three vertical rods 40, normally thrust the first contrast ring 41 toward an inactive position, in which the latter has the lower surface slightly lower than the tips of the three cutting elements 39.

A thruster element 44 is disposed inside the cylindrical tubular support 37 and is axially slidable along the second vertical axis Z2, selectively commanded by an actuation mechanism 45, preferably mounted in a fixed position (on the left in FIG. 8) on the upper part of the fixed plate 25 and which can be driven for example by a second electric motor 46.

The thruster element 44 has the function of selectively expelling toward a collection container 47 (FIG. 2), for example disposed in the lower part of the second compartment 12, below the actuation mechanism 45, each cut cylindrical part of the upper part 16 of the container 15, after the cylindrical hole 17 has been made and the first slider 31 has again reached its inactive position, as will be described in detail below.

A second small door 48 (FIGS. 1 to 4) is disposed in the front and lower part of the external cover 14 and is normally closed, but it can be opened, for example manually, to allow to remove the cylindrical parts cut by the blade 38 from the collection container 47.

The closing device 30 (FIGS. 8, 12 and 14) is mounted on the lower part of the first slider 31, coaxially to a third vertical axis Z3, which also intersects the transverse axis Y (FIG. 5) and is positioned at a first fixed distance L1 (FIG. 8) from the second vertical axis Z2 of the perforating device 29, for example of about 200 mm.

The closing device 30 comprises a mandrel 49 (FIGS. 12 and 14) having a cylindrical external surface 50 the diameter of which is equal to the internal diameter D2 of the lid 18, and a lower end 51 with a substantially truncated cone shape tapered downward.

The mandrel 49 has the function of temporarily holding a lid 18, in order to then insert it into the cylindrical hole 17 of the container 15, as will be described in detail below.

The mandrel 49 is vertically slidable with respect to the first slider 31 and is constantly thrust downward by a pair of helical springs 52 which are coaxial to the third vertical axis Z3.

The closing device 30 also comprises a second contrast ring 53, which is also coaxial to the third vertical axis Z3 and is provided with a central hole 54 having a larger diameter than the external diameter D3 of the upper part of the lid 18. Three helical springs 55 (FIG. 12) are disposed around three corresponding vertical rods 56, supported by the mandrel 49 and disposed offset by 120° from each other, and normally thrust the second contrast ring 53 toward an inactive position, in which the latter has the lower surface slightly lower than the lower end 51 of the mandrel 49.

In the right part of the second compartment 12 there is a second operating unit 60 (FIG. 5), which has the function of removing one lid 18 at a time from a store 61, disposed along a fourth vertical axis Z4, which also intersects the transverse axis Y (FIG. 5), and positioning it in a removal position, so that it can be removed by the closing device 30, as will be described in detail below.

The second operating unit 60 (FIGS. 5, 15, 16 and 17) comprises a second slider 62, which is slidable vertically along a fifth vertical axis Z5, which also intersects the transverse axis Y (FIG. 5) and is disposed at a second distance L2 (FIG. 16), for example of about 100 mm, from the fourth vertical axis Z4, by means of a third electric motor 63 (FIG. 15) mounted on the upper part of the fixed plate 25 and having its own shaft connected to a toothed wheel 64, constantly meshed with a vertical rack 65 integral with the second slider 62.

A fourth electric motor 66 (FIG. 16) is mounted on the second slider 62, which has its shaft coaxial to the fifth vertical axis Z5 and on which there is mounted an L-shaped support 67, on the vertical arm of which a plate 68 is mounted slidable vertically, on which there are pivoted two vertical jaws 69 of a removal gripper 70 (FIGS. 15, 16 and 17), configured to remove one lid 18 at a time from the store 61, that is, the one at the lowest point.

Figure 16:
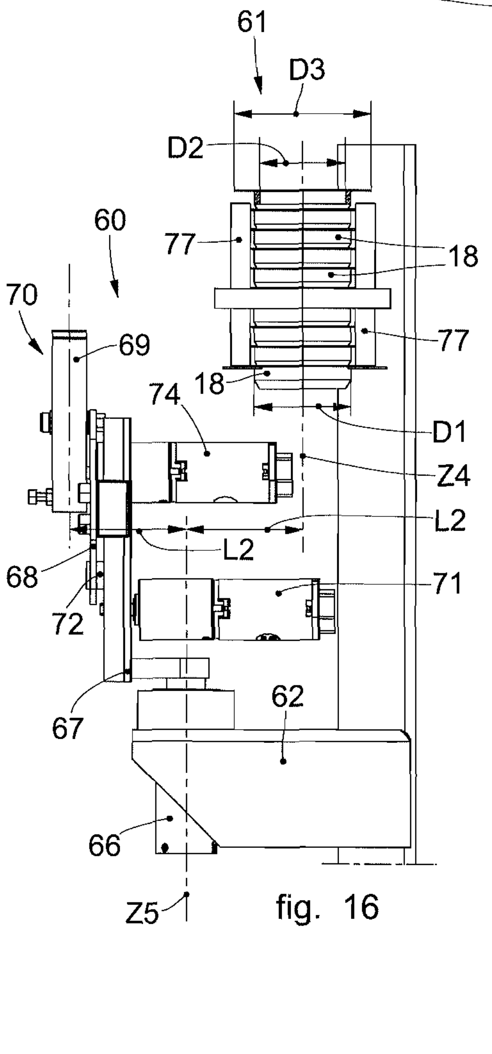
FIG. 16 is a front view, on an enlarged scale, of the second operating unit of FIG. 15.

The distance of the two jaws 69 from the fifth vertical axis Z5 is equal to the second distance L2 (FIG. 16).

The fourth electric motor 66 can be selectively driven in order to take, with a rotation of 180°, the jaws 69 from an inactive position, shown in the drawings, to a removal position, in which they are disposed along the fourth vertical axis Z4, that is, exactly aligned with the store 61 of the lids 18, in order to remove the lowest of the latter.

Furthermore, the plate 68 is vertically mobile between a lowered position and a raised position, by means of a fifth electric motor 71 mounted horizontally on the vertical arm of the support 67 and having its own shaft connected to an eccentric pin 72 (FIG. 17) inserted in a horizontal slot 73 of the same plate 68.

The two jaws 69 can be selectively actuated, between an open position, in which they are distanced, or open, and a gripping position, in which they are thrust against each other in order to grip a lid 18, by means of a sixth electric motor 74 (FIG. 16) mounted horizontally on the plate 68 and having its own shaft connected to a support element 75 (FIG. 17) at the two ends of which two small rolls 76 are rotatably mounted, which are equidistant from the axis of the sixth electric motor 74 and which each contact one of the two jaws 69.

The store 61 (FIGS. 5, 8 and 15) comprises vertical guide bars 77 configured so as to allow a plurality of lids 18 to be stacked on top of each other and thus form a stack of lids 18, with the lowest one positioned at such a level that it can be removed by the jaws 69 of the removal gripper 70, when these are in their removal position.

Figure 6:
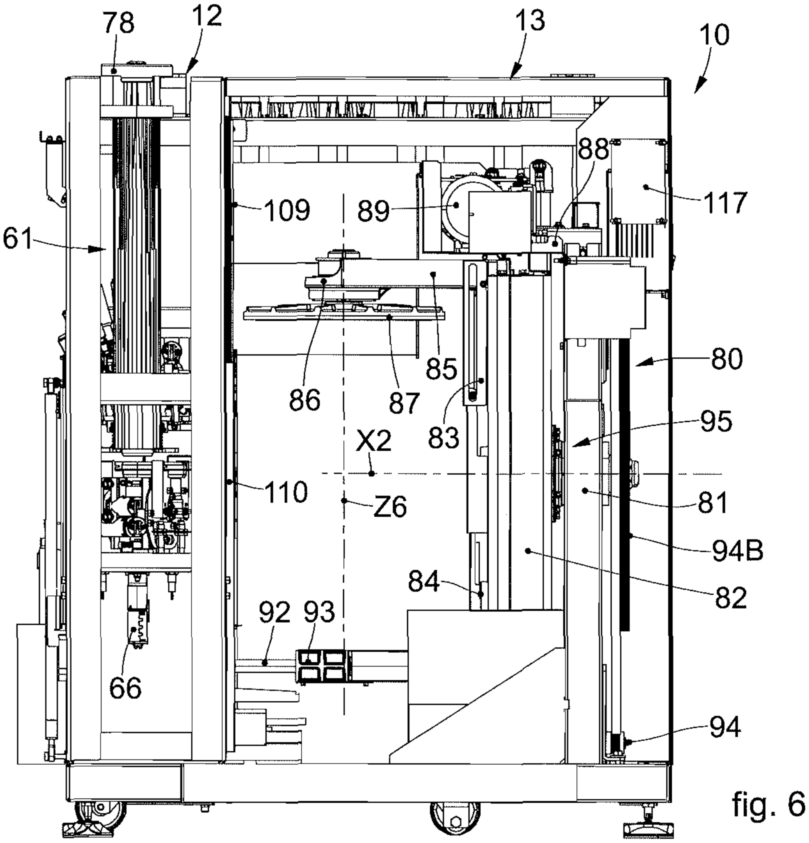
FIG. 6 is a right lateral view of the machine of FIG. 2.

On the upper part of the external cover 14 (FIG. 1) of the machine 10, exactly above the store 61, there is a third small door 78 (FIGS. 1, 2 and 6), which can be driven manually, to allow to load, when necessary, lids 18 into the same store 61.

The machine 10 also comprises a mixing device 80 (FIGS. 3, 4, 6, 18, 19, 20 and 22), of the gyroscopic type, such as for example of the type described in international patent application WO-A-2006/008590, which is disposed in the third compartment 13 and is configured to mix the coloring product, or the coloring products, contained in the container 15, after they have been delivered by the delivery device 21 and after the cylindrical hole 17 has been closed with a lid 18 by the closing device 30.

In other embodiments, not shown here, but which can be easily understood by a person of skill in the art, the mixing device 80, instead of the gyroscopic type, could be of any other known type whatsoever, or which will be developed in the future, for example of the vibrational type, such as for example that described in international patent application WO-A-2011/161532 mentioned above, or of the vortex or centrifugal type.

In the embodiment described here, the mixing device 80 is able to simultaneously impart upon the container 15 both a main rotation with respect to a second longitudinal axis X2 (FIGS. 6, 7, 18, 19 and 20), parallel to the first longitudinal axis X1, and also a secondary rotation with respect to an axis of rotation Z6, perpendicular to the second longitudinal axis X2 and which is defined here also as first mixing axis. In an inactive condition (FIG. 20) the axis of rotation Z6 is in a vertical position and also intersects the first longitudinal axis X1.

In the embodiment described here, the mixing device 80 (FIGS. 3, 4, 6, 18, 19, 20 and 22) comprises a first structure 81, which is preferably fixed, on which there is mounted a rotating support 82 rotatable around the second longitudinal axis X2. On the front part of the rotating support 82 (on the left in FIG. 20) there are mounted slidable, in reciprocally opposite senses, a third slider, or upper slider, 83 and a fourth slider, or lower slider, 84, which are configured to be constantly equidistant from the second longitudinal axis X2.

The upper slider 83 has an arm 85 which is protruding toward the second compartment 12 and has an end 86 on which an upper plate 87 is mounted in a rotating manner, parallel to the lower plate 27 and constantly coaxial to the axis of rotation Z6.

The first structure 81 comprises an upper plate 88 disposed horizontally, on which a seventh electric motor 89 is mounted in a fixed position, which is configured to reciprocally move the upper 83 and lower 84 slider toward and/or away from each other, with respect to the second longitudinal axis X2, and therefore the upper plate 87 and the lower plate 27, in particular when the latter is in a mixing position, in which its central axis is coaxial to the axis of rotation Z6, but also when the lower plate 27 is in the delivery position, in which its central axis is instead coaxial to the vertical axis Z1, as will be described in detail below.

On the upper plate 88 there is also mounted an actuation mechanism 90 (FIGS. 18, 19, 20 and 22), which can be of any known type whatsoever, or which will be developed in the future and which for the sake of brevity is not described in detail, which, when the rotating support 82 is stationary in a vertical inactive position, which is shown in the drawings, can be selectively actuated in order to make a mechanical connection between the seventh electric motor 89 and the upper 83 and lower 84 slider in order to make happen their reciprocal movement toward or away from each other. When, on the other hand, the actuation mechanism 90 is deactivated, the rotating support 82, together with the upper 87 and lower 27 plate, is free to rotate around the second longitudinal axis X2, as will be described in detail below.

Furthermore, according to another characteristic aspect of the present invention, when a container 15 to be mixed is disposed on the lower plate 27 (FIGS. 18, 19, 20 and 22), and together they are coaxial to the axis of rotation Z6, the same lower plate 27 becomes part of the mixing device 80, since it also acts as a base element to take the container 15 against the upper plate 87 and compress it, as if in a vice, while the same container 15 is made to rotate in order to mix the coloring products contained inside it.

In order to achieve this, the lower plate 27 is mounted on a fifth slider 91 so that it can always rotate freely around its vertical axis of rotation. In fact, the fifth slider 91 is slidable horizontally along the first longitudinal axis X1 between a loading position, shown in the drawings, in particular in FIG. 20, in which the same lower plate 27 is coaxial to the first vertical axis Z1, and a mixing position, schematized with a dashed line in FIG. 20, in which the same lower plate 27 is coaxial to the axis of rotation Z6.

The fifth slider 91 is provided with two horizontal bars 92 (FIGS. 18, 19 and 20) slidably inserted in two horizontal guide bushings 93 supported by the lower slider 84.

The mixing device 80 also comprises an eighth electric motor 94 mounted on the lower part of the third compartment 13 (FIG. 7) and configured to make happen the gyroscopic movement of the upper 87 and lower 27 plate and of the possible container 15 disposed between them. In particular, the eighth electric motor 94, by means of a transmission belt 94A, is able to make a pulley 94B rotate having the hub rotatable on the first structure 81, coaxially to the second longitudinal axis X2, and integral with the rotating support 82.

Moreover, inside the rotating support 82 there is disposed a transmission, or return, mechanism 95, which can also be of any known type whatsoever, or which will be developed in the future and which for the sake of brevity is not described in detail, which is able to make the upper plate 87 rotate around the axis of rotation Z6, exploiting the rotation of the pulley 94B.

Figure 21:
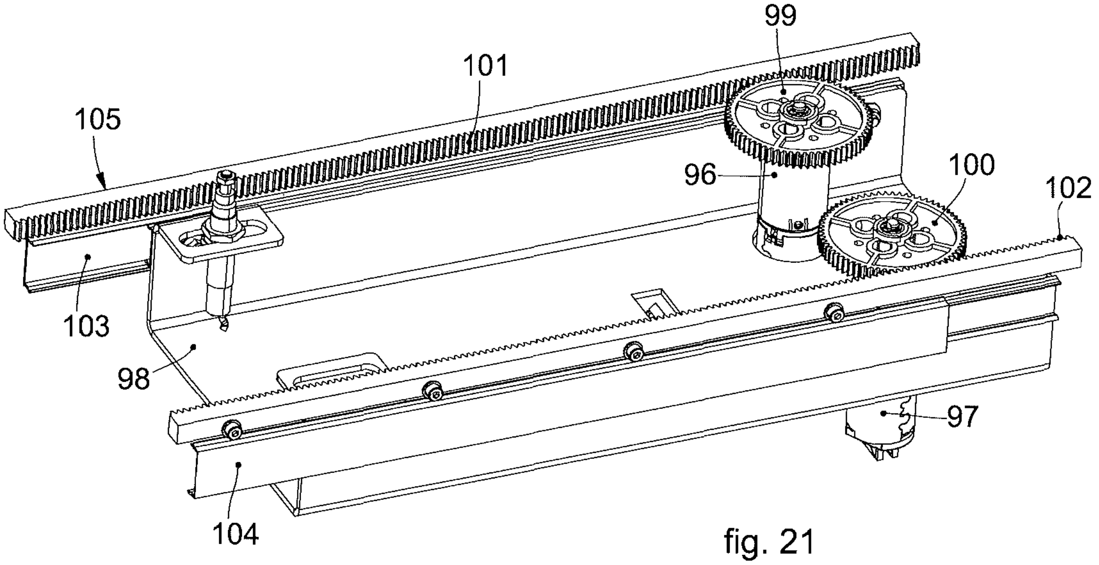
FIG. 21 is a front right perspective view of a detail, on an enlarged scale, of the third operating unit of FIG. 18.
Figure 22:
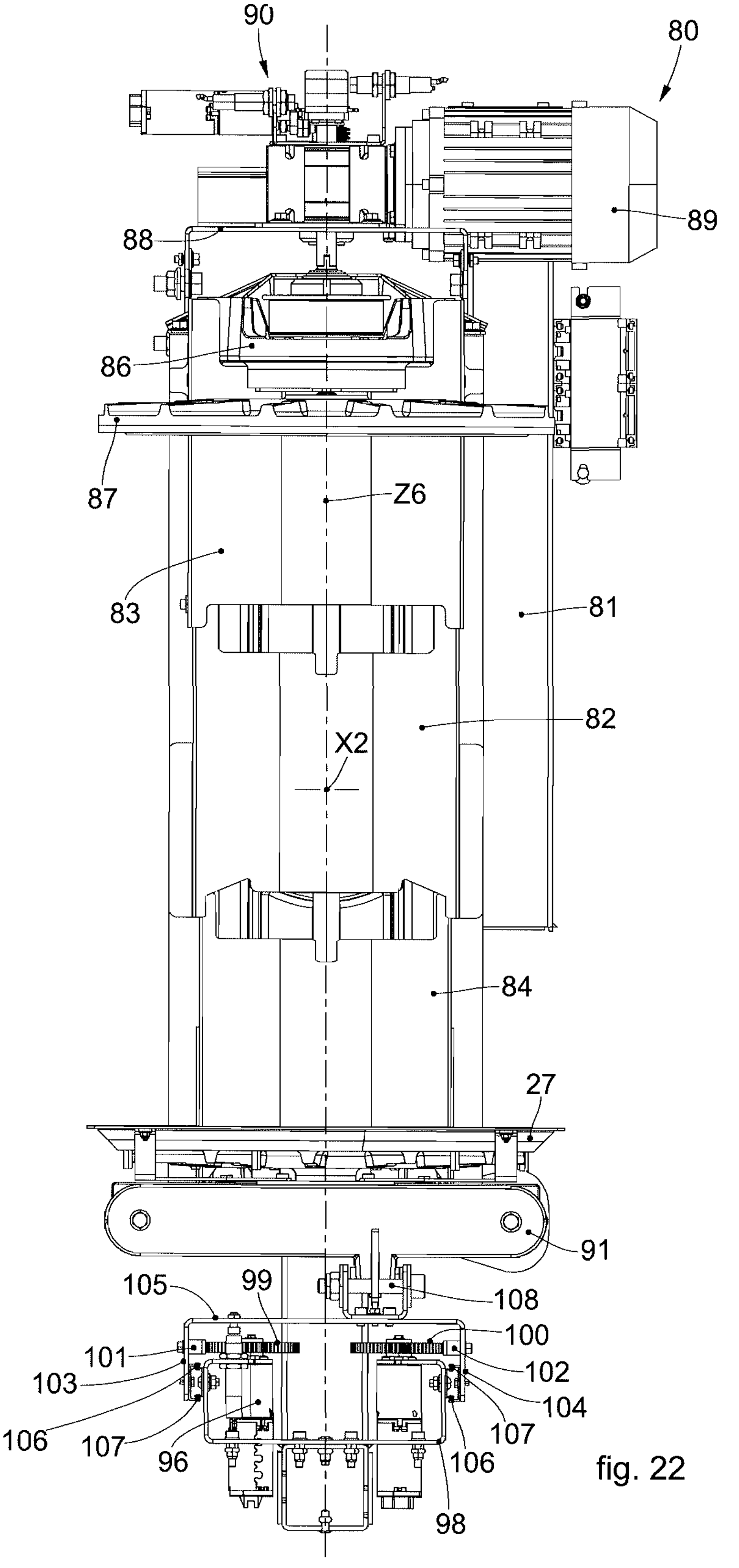
FIG. 22 is a front view, on an enlarged scale, of the third operating unit of FIG. 18.

The selective movement of the fifth slider 91 between its loading position and the mixing position, parallel to the first longitudinal axis X1, is obtained by means of a ninth and a tenth electric motor 96 and 97 (FIGS. 21 and 22) which are mounted on a second structure 98, which is preferably also fixed, disposed in the lower part of the machine 10, with their shafts disposed vertically.

Each of the two motors 96 and 97 has its shaft keyed onto a corresponding toothed wheel 99 and 100 respectively, in turn meshed with a rack 101 and 102, respectively, disposed horizontally. The two racks 101 and 102 are attached to the internal surfaces of two vertical walls 103 and 104 of a sixth slider 105 (FIGS. 20 and 22), which is slidable horizontally by means of sliding blocks 106 (FIG. 22) with respect to two guides 107 attached to the external surfaces of the second structure 98.

On the upper part of the sixth slider 105 there is attached a connection member 108 which is in engagement with the fifth slider 91, so that to each horizontal displacement of the same sixth slider 105 (FIG. 20) parallel to the first longitudinal axis X1, there corresponds a similar horizontal displacement of the fifth slider 91 and, therefore, of the lower plate 27.

Between the second compartment 12 and the third compartment 13 (FIGS. 3, 4 and 6) there is disposed a dividing door 109, parallel to the transverse axis Y and symmetrical with respect to the first longitudinal axis X1, which is slidable vertically on a guide frame 110, having substantially the shape of an inverted U.

The dividing door 109 is normally lowered, in a closed position, in order to isolate the delivery zone, which is located below the delivery device 21, from the mixing device 80, and it can be raised, in an open operative position, by means of an eleventh and a twelfth electric motor 111 and 112 (FIGS. 4 and 11) mounted on the upper part of the fixed plate 25.

Each of the two motors 111 and 112 has its shaft keyed onto a corresponding toothed wheel 113 and 114, respectively, in turn meshed with a rack 115 and 116 (FIG. 4), respectively, disposed horizontally. The two racks 115 and 116 are attached to the lateral flanks of the dividing door 109.

The machine 10 also comprises an electronic processor 117 (FIGS. 2, 3, 6 and 7) configured and programmed to selectively control and command the delivery device 21, as well as the perforating device 29, and the closing device 30, and also the mixing device 80, including all twelve electric motors 34, 46, 63, 66, 71, 74, 89, 94, 96, 97, 111 and 112, with which position sensors of a known type and not shown in the drawings are associated, which send corresponding signals to the same electronic processor 117. The machine 10 can also be provided with data input means, of any type whatsoever and not shown in the drawings, by means of which a user can select both the color as well as the hue of the final product he/she wants to obtain.

The functioning of the machine 10 described heretofore, which substantially corresponds to the method according to the present invention to automatically prepare fluid coloring products according to the present invention, is as follows.

In an initial inactive, or loading, position shown in the drawings, the machine 10 has the lower plate 27 lowered and in the loading station 26 (FIG. 2), coaxial to the first vertical axis Z1. Consequently, the upper plate 87 of the mixing device 80 is in its raised position. The first slider 31 (FIG. 8) is displaced to the left, that is, away from the delivery device 21, the dividing door 109 (FIG. 3) is lowered and the three small doors 28, 48 and 78 are closed. The removal gripper 70 (FIGS. 15 and 16) faces toward the delivery device 21, in a position of delivery of a lid 18, it is in its lowered position and has two of its jaws 69 in the open position.

The method to automatically prepare a fluid coloring product according to the present invention, using the machine 10 described heretofore, comprises a loading step, during which a user, after having opened the first small door 28 (FIG. 1), either manually or automatically, manually inserts a container 15 (FIG. 3) on the lower plate 27 of the loading station 26 and positions it so that the container 15 itself is coaxial to the first vertical axis Z1.

It should be noted that in this embodiment the container 15 already contains inside it the base substance from which to obtain the desired coloring product, by adding coloring substances. Furthermore, the upper part 16 of the container 15 is devoid of any aperture whatsoever. In fact, the cylindrical hole 17 will be made automatically by the perforating device 29, in a subsequent perforation step.

The first small door 28 is then closed again, either manually or automatically, and will remain clamped in this position until the completion of the operating cycle, that is, when the container 15, hermetically closed by a lid 18, and after having undergone a mixing step, can be removed from the loading station 26.

Optionally, the machine 10 can automatically carry out a centering operation of the container 15 with respect to the lower plate 27, by any known mean whatsoever, such as for example those described in international patent application WO-A-2011/161532 mentioned above, or which will be developed in the future.

In this way, the container 15 is positioned exactly below the delivery device 21, but still lowered with respect to it.

A perforation step is then carried out to make the cylindrical hole 17 in the upper part 16 of the container 15. In order to do this, the electronic processor 117 commands the first electric motor 34 in order to translate the first slider 31 to the right, taking it from the inactive position, shown in FIG. 8, to the first operative position, shown in FIG. 9, in which the vertical axes Z1 and Z2 coincide.

Keeping the first slider 31 stationary in this first operative position, the electronic processor 117 first commands the actuation mechanism 90 (FIGS. 20 and 22) and then the seventh electric motor 89 in order to cause the raising of the lower slider 84 (FIGS. 15, 18, 19, 20 and 22) and, consequently, also of the lower plate 27, until the container 15 is taken against the perforating device 29 (FIG. 9), until the blade 38 (FIG. 13) of the latter penetrates the upper part 16 (FIG. 14) of the same container 15 with its cutting elements 39 and makes the circular hole 17. A similar downward movement, which in this step is loadless, of the upper plate 87 of the mixing device 80 corresponds to this upward movement of the lower plate 27.

In addition and simultaneously, while the first slider 31 remains in this first operative position (FIG. 9), on the mandrel 49 of the closing device 30 there is positioned a lid 18, which had been previously removed from the store 61, with a removal step during a previous operating cycle, by driving the second operating unit 60, and which is gripped between the jaws 69 of the removal gripper 70, as will be described in detail below. In particular, first the fifth electric motor 71 is commanded, in order to raise the plate 68 and the removal gripper 70, until the inside of the lid 18, gripped between the jaws 69, is taken into contact with the cylindrical external surface 50 (FIG. 12) of the mandrel 49, then the sixth electric motor 74 is commanded, in order to open the jaws 69 and free the lid 18, then once again the fifth electric motor 71 is commanded, in order to lower the plate 68 and the gripper 70, keeping the jaws 69 open.

Figure 13:
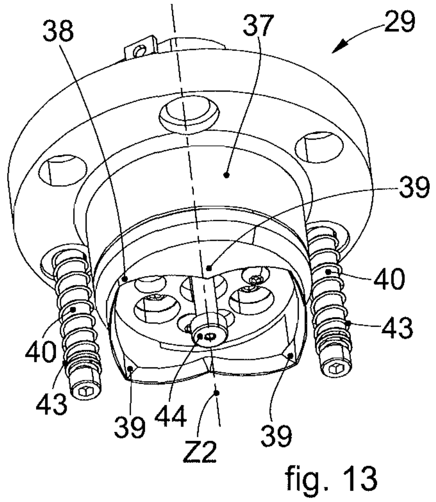
FIG. 13 is a partial perspective view, on a further enlarged scale, of a first detail of the sub-unit of FIG. 12.

Once the cylindrical hole 17 has been made and the lid 18 has been inserted on the mandrel 49 (FIG. 14), with a reverse command to the seventh electric motor 89 (FIGS. 20 and 22), the lower plate 27 and the container 15 are lowered again, while the blade 38 temporarily holds the removed part of the upper part 16 (FIG. 14) of the container 15 between its cutting elements 39 (FIG. 13). Then the first electric motor 34 is commanded in reverse so that the first slider 31 returns to its initial position, shown in FIG. 8.

To this downward movement of the lower plate 27 there corresponds a similar upward movement of the upper plate 87 of the mixing device 80, which thus returns to its initial position.

A delivery step is then carried out, which occurs automatically under the control of the electronic processor 117.

This delivery step provides that the seventh electric motor 89 (FIGS. 20 and 22) is commanded again, so that the lower plate 27 and the container 15 mounted thereon are raised again until the central hole 17 (FIG. 14), made in the upper part 16 of the container 15, is taken close to the lower tips of the nozzles 23 (FIG. 11) of the delivery device 21.

The electronic processor 117 then commands, in a programmed manner, the actual delivery of determinate quantities of at least one or more coloring substances selected automatically, possibly together with other non-coloring substances, in order to obtain the desired color, removing them from the respective tanks 19 (FIG. 2), by means of the volumetric pumps 20, and conveying them through the tubular terminals 24 and the nozzles 23 (FIG. 11) into the container 15.

At the end of the delivery step, a step is carried out of hermetically closing the cylindrical hole 17 of the container 15 by means of the lid 18 which is already positioned on the mandrel 49, as previously described. In particular, the electronic processor 117 first possibly once again commands the seventh electric motor 89 to cause the lowering of the lower plate 27, in order to move the container 15 away from the nozzles 23 and then, in any case, once again commands the first electric motor 34 so as to translate the first slider 31 to the right, taking it from the inactive position, shown in FIG. 8, to the second operative position, shown in FIG. 10, in which the vertical axes Z1 and Z3 coincide.

Keeping the first slider 31 stationary in this second operative position, the electronic processor 117 once again commands the seventh electric motor 89 in order to cause the raising of the lower slider 84 (FIGS. 15, 18, 19, 20 and 22) and, consequently, also of the lower plate 27, until the container 15 is taken against the lid 18 positioned on the mandrel 49, until the same lid 18 enters the cylindrical hole 17, closing it hermetically. Also in this case, a similar downward movement, which also in this step is loadless, of the upper plate 87 of the mixing device 80 corresponds to the upward movement of the lower plate 27.

Figure 8:
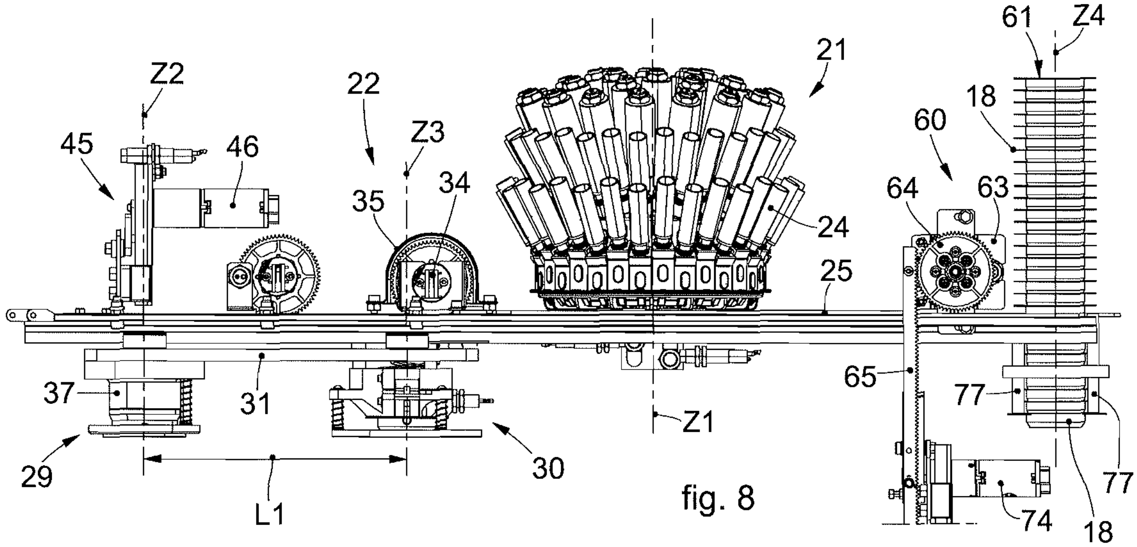
FIG. 8 is a front view of a first operating unit of the machine of FIG. 1, on an enlarged scale and shown in an inactive position.

Upon completion of the closing step, the electronic processor 117 once again commands the seventh electric motor 89 to cause the lowering of the lower slider 84 (FIGS. 15, 18, 19, 20 and 22) and, consequently, also of the lower plate 27 and then once again commands the first electric motor 34 so as to translate the first slider 31 toward the left, taking it from its inactive position, shown in FIG. 8.

Once the cylindrical hole 17 of the container 15 has been hermetically closed with the lid 18, the electronic processor 117 possibly commands a step of mixing or shaking by means of the mixing device 80.

In particular, the electronic processor 117 first commands the opening, that is, the raising, of the dividing door 109 (FIGS. 3 and 4), simultaneously driving the eleventh electric motor 111 and the twelfth electric motor 112 (FIGS. 4 and 11), and then the horizontal displacement toward the right, parallel to the first longitudinal axis X1, of the sixth slider 105 (FIG. 20), simultaneously driving the ninth electric motor 96 (FIGS. 21 and 22) and the tenth electric motor 97. In this way, the fourth slider 91 is also displaced toward the right, together with the lower plate 27 and the container 15 resting on it, until the axis of rotation of the lower plate 27 coincides with the axis of rotation Z6, in perfect alignment with the upper plate 87 (a position not shown in the drawings, but easily understood by a person of skill in the art).

Then the electronic processor 117 once again commands the seventh electric motor 89 (FIGS. 15, 18, 19, 20 and 22) to cause the lowering of the upper slider 83 and the simultaneous raising of the lower slider 84 and, consequently, also of the lower plate 27, until the container 15 is clamped between the lower plate 27 and the upper plate 87.

Then the eighth electric motor 94 is driven, which rotates the whole rotating system of the mixing device 80, that is, the rotating support 82 and, by means of the transmission mechanism 95, also the upper plate 87 around its axis of rotation Z6 and consequently also the container 15 and the lower plate 27.

The actual mixing step consists of a frenetic rotation, in a gyroscopic manner, of the container 15 clamped between the lower plate 27 and the upper plate 87, for a determinate period of time, for example comprised between 0.5 min and 5 min, in order to thus mix the base product with the coloring substances injected by the delivery device 21 and obtain the desired finished product.

At the end of the actual mixing step as above, the electronic processor 117 stops the eighth electric motor 94 when the rotating support 82 is again in its initial inactive position, with the axis of rotation Z6 vertical (FIG. 20), after which it commands first the actuation mechanism 90 and then the seventh electric motor 89, in the opposite sense to that last performed, in order to cause the raising of the upper slider 83 and the simultaneous lowering of the lower slider 84, the lower plate 27 and the container 15.

Then the electronic processor 117 commands the electric motors 96, 97 in the opposite sense, so that the lower plate 27 and the container 15, with its content already mixed, return to their initial positions, that is, with the latter coaxial to the first vertical axis Z1.

Furthermore, every time the lower plate 27 moves from its loading position, in which it is coaxial to the first vertical axis Z1, to its mixing position, in which it is coaxial to the axis of rotation Z6, the electronic processor 117 selectively commands the eleventh 111 and twelfth 112 electric motor in order to raise and then once again lower the dividing door 109.

Figure 17:
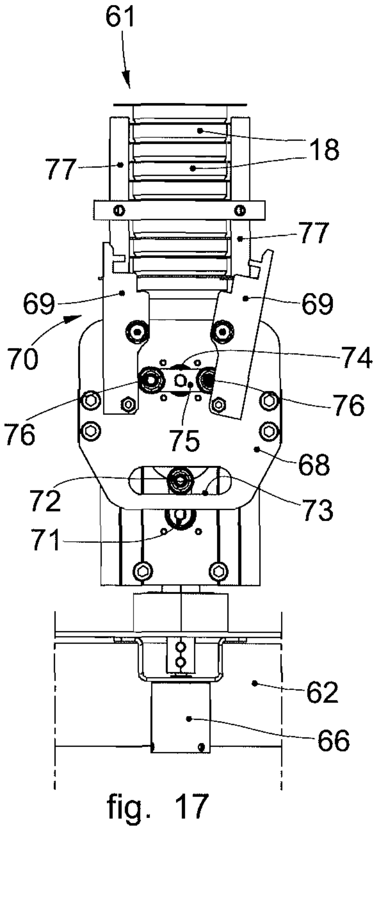
FIG. 17 is a left side view, on an enlarged scale, of the second operating unit of FIG. 15.
Figure 19:
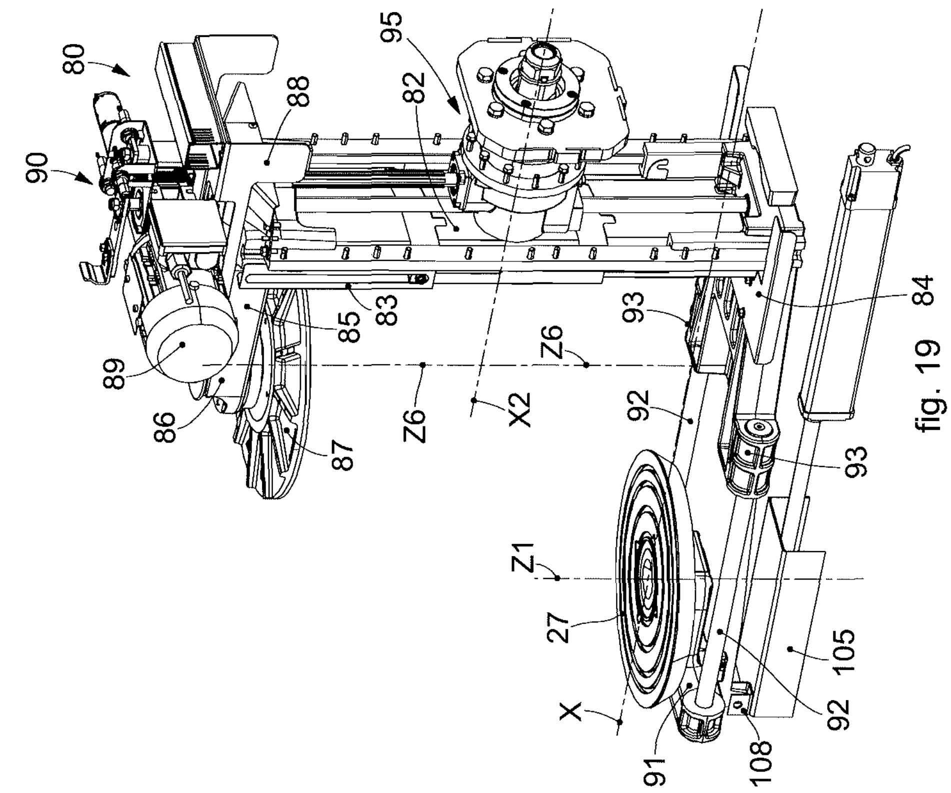
FIG. 19 is a rear right perspective view of the third operating unit of FIG. 18.
Figure 18:
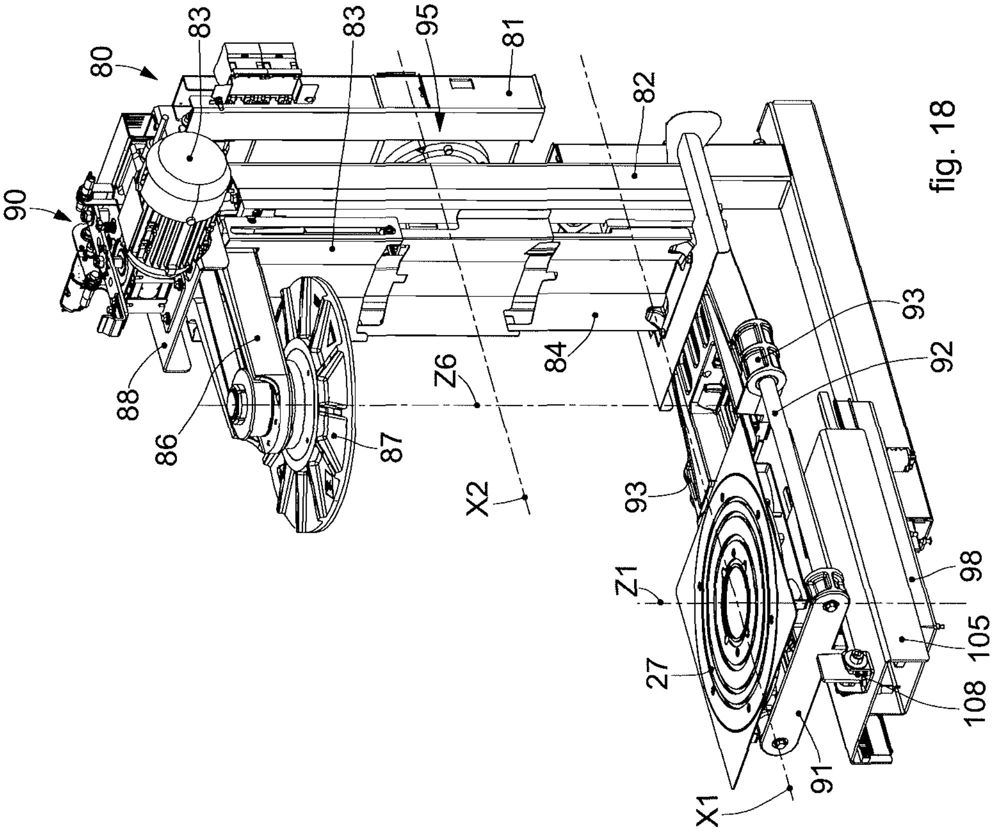
FIG. 18 is a front right perspective view of a third operating unit of the machine of FIG. 1.
Figure 20:
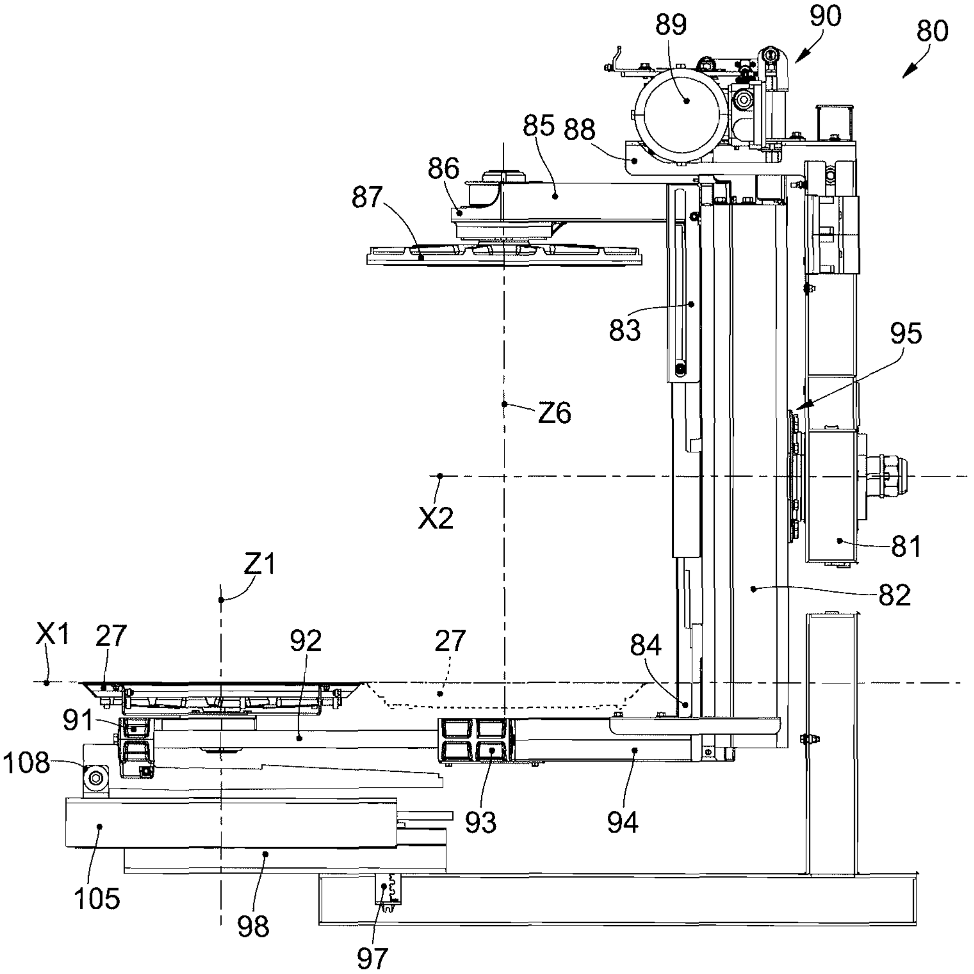
FIG. 20 is a right lateral view of the third operating unit of FIG. 18.

At the same time as the delivery step, or the mixing step as above, or separately with respect thereto, there is also performed a step of removing a lid 18 from the store 61 by means of the second operating unit 60 (FIGS. 15, 16 and 17). In particular, the electronic processor 117 first commands the fourth electric motor 66 in order to rotate the support 67 by 180° and thus take the removal gripper 70, with the jaws 69 still open, below the store 61, into a removal position, in alignment with the fourth vertical axis Z4. Then the electronic processor 117 first commands the fifth electric motor 71, in order to raise the plate 68 until it takes the upper part of the two jaws 69 into alignment with the upper part of the lid 18 which is at the bottom of the stack in the store 61, and then the sixth electric motor 74, in order to close the jaws 69 so that they clamp the lid 18 between them.

Then the electronic processor 117 commands, in sequence and in the opposite sense to the previous one, first the fifth electric motor 71 in order to lower the plate 68 and the removal gripper 70 to their initial vertical position, with the jaws 69 closed around the lid 18 removed, and then the fourth electric motor 66 in order to rotate the support 67 by 180° and thus take the removal gripper 70 once again to its initial inactive position, shown in FIG. 16, but with a lid 18 clamped between the jaws 69, ready to be inserted, in a subsequent operating cycle, in the mandrel 49, as has been previously described.

Figure 11:
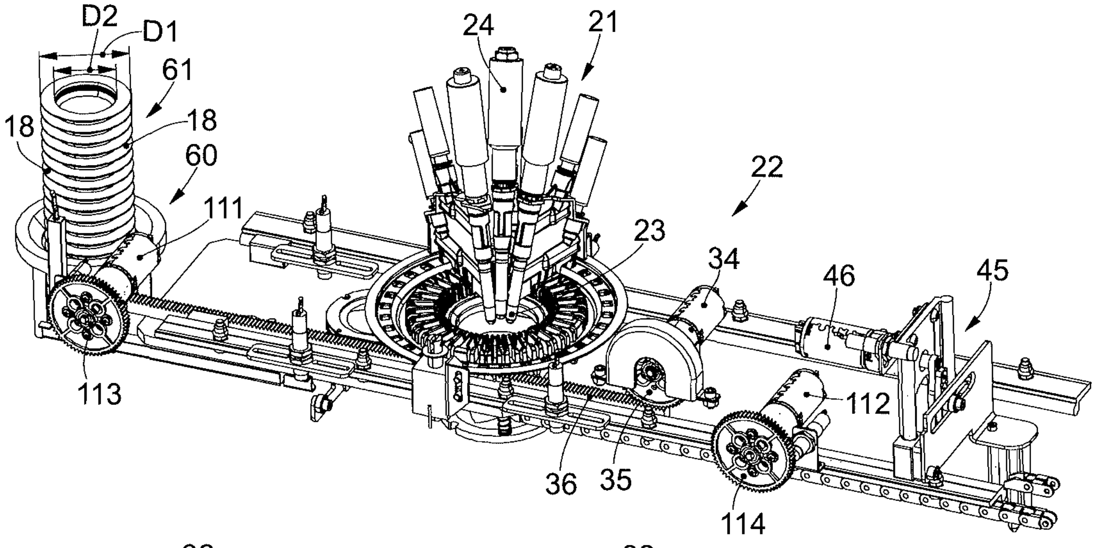
FIG. 11 is a rear left perspective view of the first operating unit of FIG. 8.

At the same time as the removal step as above, or separately from it, an expulsion step is also carried out, during which the part removed from the upper part 16 of the lid 18, which is still between the cutting elements 39 of the blade 38, now in alignment with the second vertical axis Z2, is thrust toward the collection container 47 below (FIG. 2) by the thruster element 44 (FIG. 13) which is lowered by means of the actuation mechanism 45 (FIGS. 2 and 11), commanded by the second electric motor 46 (FIG. 11).

At this point the operating cycle is completed, the first small door 28 can be reopened and the container 15, containing the desired colored product and hermetically closed with the lid 18, can be removed manually by the user.

It is therefore clear that all the steps of the operating cycle, including the making of the cylindrical hole 17 in the upper part of the container 15 and the hermetic closing of the same cylindrical hole 17, are managed automatically by the electronic processor 117, with only the intervention of the same user, without needing the presence of a specialized operator.

Furthermore, according to one variant of the present invention, not shown in the drawings, but easily understood by a person of skill in the art, the machine 10 could be without the mixing device 80, as described above, and instead be provided with a simplified mixing member, directly connected to the lower plate 27, in order to rotate the latter, together with the container 15, around the first vertical axis Z1, after the completion of both the step of delivering the coloring substances, injected by the delivery device 21, and also the step of closing the cylindrical hole 17 with the lid 18, by means of the closing device 30. For example, during the drive of the simplified mixing member as above, the container 15 could be kept stationary on the underlying lower plate 27 by mechanical, or electromagnetic, means of a known type.

It should be noted that, advantageously, the lower plate 17, which acts as a support member of the container 15, is always supported by the first structure 81, both during the mixing step by means of the mixing device 80, and also during the delivery step, when the container 15 is associated with the delivery device 21.

It is clear that modifications and/or additions of parts may be made to the machine 10 and to the corresponding method as described heretofore, without departing from the field and scope of the present invention.

For example, in a simplified version of the machine 10, the lower plate 27 could be provided with a mandrel with self-centering jaws, of a known type and possibly motorized, which could keep the container 15 stationary in position. In this case, the presence of the upper plate 87 and of the corresponding members for moving the upper 83 and lower 84 slider toward/away from each other would not be necessary.

Furthermore, for example, the delivery device 21 could move parallel to the first longitudinal axis X1 from an inactive position, in which it is disposed along the first vertical axis Z1, to a delivery position, in which it is disposed along the axis of rotation Z6, whereby the latter also becomes the axis of delivery.

It is also clear that, although the present invention has been described with reference to a specific example of one embodiment, a person of skill in the art shall certainly be able to achieve many other equivalent forms of machine to automatically prepare fluid coloring products, and of the corresponding methods, having the characteristics as set forth in the claims and hence all coming within the field of protection defined thereby.

The invention claimed is:

1. A machine to automatically prepare a fluid coloring product inside a container, the container configured to already contain a base product, the machine comprising:
- at least one nozzle configured to deliver at least one coloring substance inside the container through an aperture provided in the upper part of the container;
- a blade configured to make the aperture;
- a closing device configured to automatically and hermetically close the aperture with at least one closing element when the container is in a delivery position;
- a mixing device configured to shake the container and therefore mix the coloring substances inside the container when the container is in a mixing position; and
- a support member configured to support the container, both in the delivery position, and also in the mixing position, wherein the support member is configured to remain stationary to maintain the container in the delivery position while the blade and the closing device shift along a transverse axis to form the aperture and then close the aperture, respectively, and wherein the support member is configured to move along a first longitudinal axis to move the container between the delivery position and the mixing position, the container moving along the first longitudinal axis and away from the transverse axis to move from the dispense position to the mixing position.

2. The machine as in claim 1, wherein the support member comprises a lower plate provided with central axis, which is substantially parallel to, or coinciding with, a first vertical axis around which the delivery at least one nozzle is disposed, when the container is in the delivery position, and which is substantially parallel to, or coinciding with, an axis of rotation when the container is in the mixing position.

3. The machine as in claim 2, wherein the at least one nozzle is disposed vertically in a fixed position above a loading station of the container, in substantial alignment with the first vertical axis, and in that the blade and the closing device are mounted on a slider slidable along a transverse axis which intersects the first vertical axis.

4. The machine as in claim 3, wherein the blade has a second vertical axis, in that the closing device has a third vertical axis, and in that the slider is selectively mobile between an inactive position, in which both the second vertical axis and also the third vertical axis are distant from the first vertical axis, at least a first operative position, in which the second vertical axis substantially coincides with the first vertical axis, and a second operative position, in which the third vertical axis substantially coincides with the first vertical axis.

5. The machine as in claim 4, wherein the at least one closing element comprises a lid, in that the closing device comprises a mandrel configured to insert the lid in the aperture of the container, and in that the closing device is further configured to remove the lid from a store in which a plurality of lids is stored and position the lid on the mandrel.

6. The machine as in claim 4, further comprising a cylindrical tubular support attached to the slider, developing along the second vertical axis, and inside which there is attached the blade, coaxial to the second vertical axis and shaped so as to define three cutting elements, having a shape such as to hold between the three cutting elements the cut cylindrical part of the upper part of the container when making the cylindrical hole, so that the cut cylindrical part does not fall inside the container.

7. The machine as in claim 6, further comprising a thruster element disposed inside the cylindrical tubular support, and axially slidable along the second vertical axis, and selectively commanded by an actuation mechanism to selectively eject toward a collection container each of the cylindrical parts cut from the upper part of the container, when the slider is in the inactive position.

8. The machine as in claim 2, wherein the lower plate is configured to move selectively in a bi-directional manner, along a first longitudinal axis, which intersects perpendicularly both the first vertical axis, and also the first axis of rotation, between the delivery position and the mixing position, and vice versa.

9. The machine as in claim 2, wherein the mixing device further comprises an upper contrast member, parallel to the lower plate, and in that the lower plate and the upper contrast member are configured to compress the container therebetween, when the container is in the mixing position.

10. The machine as in claim 2, wherein the mixing device comprises at least a fixed structure configured to support the lower plate and also comprises a rotating support on which an upper slider, which rotatably supports the upper contrast member, and a lower slider, which slidably supports the lower plate, are mounted sliding with reciprocal motion such that the upper slider and lower slider are configured to move one or both of closer together and further apart parallel to the axis of rotation.

11. The machine as in claim 10, wherein the mixing device comprises command means to command the reciprocal movement of the upper and lower sliders toward/away from each other, parallel to the first axis of rotation so as to determine the reciprocal movement toward/away from each other of the upper contrast member and the lower plate, parallel to the first axis of rotation.

12. A machine to automatically prepare a fluid coloring product inside a container, the container configured to already contain a base product, the machine comprising:

a delivery device disposed vertically in a fixed position above a loading station of the container, the delivery device configured to deliver at least one or more coloring substances inside the container through an aperture provided in the upper part of the container;

a blade configured to make the aperture;

a mandrel configured to automatically and hermetically close the aperture with a lid when the container is in a delivery position by inserting the lid into the aperture of the container;

a support on which a removal gripper is mounted and having two jaws configured to remove one lid at a time from a store in which a plurality of the lids are stored, wherein the support is mobile at least between a removal position, in which the removal gripper is in correspondence with the store, and a delivery position, in which the removal gripper is in correspondence with the mandrel;

a mixing device configured to shake the container and therefore mix the coloring substances inside the container when the container is in a mixing position; and a lower plate configured to support the container, both in the delivery position, and also in the mixing position.

13. A machine to automatically prepare a fluid coloring product inside a container, the container configured to already contain a base product, the machine comprising:

a delivery device disposed vertically in a fixed position above a loading station of the container, the delivery device configured to deliver at least one or more coloring substances inside the container through an aperture provided in the upper part of the container;

a blade configured to make the aperture;

a closing device configured to automatically and hermetically close the aperture with at least one closing element when the container is in a delivery position by inserting the at least one closing element into the aperture of the container;

a mixing device configured to shake the container and therefore mix the coloring substances inside the container when the container is in a mixing position; and a lower plate configured to support the container, both in the delivery position, and also in the mixing position;

wherein the lower plate is provided with a central axis disposed substantially parallel to or coinciding with a first vertical axis around which the delivery device is disposed with the container in the delivery position, and which central axis is one of substantially parallel to and coinciding with an axis of rotation with the container in the mixing position;

wherein the delivery device is disposed vertically in a fixed position above a loading station of the container, in substantial alignment with the first vertical axis;

wherein the blade and the closing device are mounted on a slider slidable along a transverse axis which intersects the first vertical axis; and wherein a controller is configured to control movement of the lower plate and to drive:

the blade, in order to make the aperture in the upper part of the container;

the delivery device in order to deliver the at least one or more coloring substances into the container through the aperture;

the closing device, while the container is in the delivery position, in a manner coordinated with the displacement of the slider along the transverse axis; and the mixing device.

14. A method to automatically prepare a fluid coloring product inside a container configured to contain a base product inside of the container, by a machine comprising configured to deliver at least one or more coloring substances inside the container through an aperture made in an upper part of the container, and the machine including a support member configured to support the container in both a delivery position and a mixing position, the method comprising:

when the container is in the delivery position, perforating the container with a perforating device to make the aperture;

delivering, with the container in the delivery position, the at least one or more coloring substances inside the container through the aperture;

automatically and hermetically closing the aperture of the container by a closing device applying at least one closing element to the aperture with the container in the delivery position;

maintaining the container in a first location along a transverse axis and along a first longitudinal axis during the perforating of the container, the delivering of the at least one coloring substance inside the container, and the automatically and hermetically closing the aperture;

mixing the at least one or more coloring substances in the container with the container in the mixing position;

wherein the perforating device and the closing device move together along the transverse axis and relative to the container between each of the perforating of the container, the delivering the at least one or more coloring substances inside the container, and the automatically and hermetically closing the aperture; and wherein the container is at the first location along the transverse axis with the container in the mixing position and such that the container is supported by the support member both when the container is in the delivery position, and when the container is in the mixing position.

15. The method as in claim 14, wherein perforating the container, delivering the at least one or more coloring substances inside the container, and automatically and hermetically closing the aperture are performed in succession while the container is in the delivery position, in correspondence with a loading station of the container.

16. The method as in claim 14, further comprising, after automatically and hermetically closing the aperture, transferring the support member, together with the container, from the delivery position to the mixing position and, after mixing the at least one or more coloring substances in the container, transferring the support member, together with the container, from the mixing position to the delivery position.

17. The method as in claim 14, wherein at the same time as at least one of delivering the at least one or more coloring substances inside the container and mixing the at least one or more coloring substances in the container, removing the closing element from a store in which the closing element is provided.

* * * * *